(12) United States Patent
Lichtenau et al.

(10) Patent No.: US 10,579,375 B2
(45) Date of Patent: Mar. 3, 2020

(54) METHOD TO BUILD RECONFIGURABLE VARIABLE LENGTH COMPARATORS

(71) Applicant: INTERNATIONAL BUSINESS MACHINES CORPORATION, Armonk, NY (US)

(72) Inventors: Cedric Lichtenau, Stuttgart (DE); Silvia M. Mueller, Altdorf (DE); Jens P. Seifert, Gaertringen (DE); Jörg-Stephan Vogt, Holzgerlingen (DE); Markus Lachenmayr, Friedberg (DE); L'Emir Salim Chehab, Darmstadt (DE); Pavankrishna Ellore Ramesh, Hannover (DE); Sourabh Chougule, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/889,315

(22) Filed: Feb. 6, 2018

(65) Prior Publication Data

US 2019/0243650 A1    Aug. 8, 2019

(51) Int. Cl.
*G06F 9/30*    (2018.01)
*G06F 16/22*    (2019.01)

(52) U.S. Cl.
CPC ........ *G06F 9/30036* (2013.01); *G06F 9/3004* (2013.01); *G06F 16/221* (2019.01)

(58) Field of Classification Search
CPC ... G06F 9/30036; G06F 16/221; G06F 9/3004
See application file for complete search history.

(56) References Cited

U.S. PATENT DOCUMENTS

| 4,933,662 | A  | 6/1990  | Szczepanek    |
| 5,592,142 | A  | 1/1997  | Adams et al.  |
| 5,887,183 | A  | 3/1999  | Agarwal       |
| 6,681,315 | B1 | 1/2004  | Hilts         |
| 7,352,275 | B2 | 4/2008  | Coloma        |
| 7,403,407 | B1 | 7/2008  | Wanzakhade    |
| 8,065,322 | B2 | 11/2011 | Nagoya        |

(Continued)

FOREIGN PATENT DOCUMENTS

EP    3091450 A1    9/2016

OTHER PUBLICATIONS

Raman et al., "DB2 with BLU Acceleration: So Much More than Just a Column Store", Proceedings of the VLDB Endowment, vol. 6, No. 11, pp. 1-12.

(Continued)

*Primary Examiner* — Leon Viet Q Nguyen
(74) *Attorney, Agent, or Firm* — Alexis N. Hatzis (57) ABSTRACT

The present disclosure relates performing of comparisons between a first and a second vector. The memory location has a size or length of m bits. A compare block to compare two single bits is used. The compare block comprises: two input bits associated to one of the bits from the first and the second vector respectively; a greater than input bit and a lower than input bit; a cascade enable input bit to control if the greater than input bit and the lower than input bit are considered; a greater than result bit, a lower than result bit, and an equal result bit. A daisy chaining of m of the one-bit compare blocks is performed such that the result bits of one compare block represents the compare result of the previous compare blocks in the chain.

11 Claims, 6 Drawing Sheets

(56) References Cited

U.S. PATENT DOCUMENTS

| | | |
|---|---|---|
| 8,843,527 B2 | 9/2014 | Diner et al. |
| 9,424,308 B2 | 8/2016 | Buyuktosunoglu et al. |
| 2006/0101258 A1 | 5/2006 | Jones |
| 2007/0255933 A1 | 11/2007 | Moyer |
| 2010/0124308 A1 | 5/2010 | Chang |
| 2012/0330931 A1 | 12/2012 | Nakano et al. |
| 2014/0189296 A1 | 7/2014 | Ould-Ahmed-Vall |
| 2015/0186141 A1 | 7/2015 | Plotnikov |
| 2016/0188532 A1 | 6/2016 | Ould-Ahmed-Vall |
| 2016/0364154 A1 | 12/2016 | Amidi et al. |
| 2018/0217845 A1 | 8/2018 | Kimura |
| 2019/0155603 A1 | 5/2019 | Villmow |

OTHER PUBLICATIONS

Mehra, "2-Bit Comparator Using Different Logic Style of Full Adder", International Journal of Soft Computing and Engineering (IJSCE), ISSN: 2231-2307, vol. 3, Issue-2, May 2013, pp. 277-279.

Abdel-Hafeez et al., "Scalable Digital CMOS Comparator Using a Parallel Prefix Tree", IEEE Transactions on Very Large Scale Integration (VLSI) Systems, vol. 21, No. 11, Nov. 2013, pp. 1989-1998.

Kim et al., "FAST: Fast Architecture Sensitive Tree Search on Modern CPUs and GPUs", SIGMOD'10, Jun. 6-11, 2010, pp. 339-350.

Hilewitz et al., "Performing Advanced Bit Manipulations Efficiently in General-Purpose Processors", 18th IEEE Symposium on Computer Arithmetic(Arith'07), 2007 IEEE, pp. 1-10.

IBM, List of IBM Patents or Patent Applications Treated as Related, Appendix P, dated Oct. 16, 2018, 2 pages.

Pending U.S. Appl. No. 15/889,328, filed Feb. 6, 2018, entitled: "Method to Reduce Effort in Variable Width Comparators".

FIG. 1

"CE_in, GT_in, LT_in, A_in, B_in" => 'GT_out, 'EQ_out', LT_out'

METHOD TO BUILD RECONFIGURABLE VARIABLE LENGTH COMPARATORS

BACKGROUND

The present invention relates to the field of digital computer systems, and more specifically, to a method to perform comparisons between a first and a second vector of multiple binary numbers or characters stored in one processor register or at a memory location each.

One central component of a database is its search engine used to process queries. Especially the inner loop is comparing a search value against all entries of a column and checking for equal or within a range. Modern databases are storing their data in a compressed format. Due to the general data distribution, the data saved in a column will have different lengths based on the compression dictionary. Compressed data is saved in long words to maximize space/load/store utilization, with every compressed data element having the same size within this long word/or database page area. However, the search of such data is implemented in software and requires a large number of instructions, limiting the throughput.

SUMMARY

Various embodiments perform comparisons between vectors of multiple bits stored in one processor register or a memory location each. Advantageous embodiments are described in the dependent claims. Embodiments of the present invention can be freely combined with each other if they are not mutually exclusive.

In one aspect of the invention, the invention relates to a comparator to perform comparisons between a first and a second vector of multiple bits each stored in a memory location to compare two single bits. The comparator comprises two input bits associated with one of the bits from the first and the second vector respectively, a greater than input bit and a lower than input bit, a cascade enable input bit to control if the greater than input bit and the lower than input bit are considered, and a greater than result bit, a lower than result bit, and an equal result bit. The comparator performs a daisy chaining of m of one-bit compare blocks such that the result bits of one compare bock represents the compare result of the previous compare blocks in the chain when the cascade enable bits are set for each of the compare blocks, and cascase enable input bits are disabled to implement a boundary between two vector elements and the type of the comparison specifies comparisons between two bits as equal, greater, lower, lower or equal, or greater or equal.

In another aspect, the invention relates to a method to perform comparisons between a first and a second vector of multiple bits representing at least one of numeric values and string characters stored in a memory location each, wherein the memory location has a size or length of m bits, the type of the comparison and the result of the comparison are stored, and wherein the type of the comparison specifies one of the following comparisons between two bits: equal, greater, lower, lower or equal, greater or equal, wherein a compare block to compare two single bits is used. The compare block comprises:
two input bits associated to one of the bits from the first and the second vector respectively;
a greater than input bit and a lower than input bit;
a cascade enable input bit to control if the greater than input bit and the lower than input bit are considered;
a greater than result bit, a lower than result bit, and an equal result bit;
and wherein the method comprises performing a daisy chaining of m of the one-bit compare blocks such that the result bits of one compare block represents the compare result of the previous compare blocks in the chain when the cascade enable bits are set for each of the compare blocks, and cascade enable input bits are disabled to implement a boundary between two vector elements.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a comparator to perform comparisons between a first and a second vector of multiple bits representing at least one of numeric values and string characters stored in a memory location each, the memory location having a size of m bits the type of the comparison and the result of the comparison are stored, and wherein the type of the comparison specifies one of the following comparisons between two bits: equal, greater, lower, lower or equal, greater or equal, wherein a one bit compare block is configure to compares two single bits, wherein the one bit compare block comprises: two input bits associated to one of the bits from the first and the second vector respectively; a greater than input bit and a lower than input bit; a cascade enable input bit to control if the greater than input bit and the lower than input bit are considered; a greater than result bit, a lower than result bit, and an equal result bit, wherein the comparator is configured such that the result bits of one compare block represents the compare result of the previous compare blocks in the chain when the cascade enable bits are set for each of the compare blocks, and cascade enable input bits are disabled to implement a boundary between two vector elements.

BRIEF DESCRIPTION OF THE SEVERAL VIEWS OF THE DRAWINGS

In the following embodiments the invention are explained in greater detail, by way of example only, making reference to the drawings in which.

DETAILED DESCRIPTION

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand.

The first and second vector of bits represent numeric values and/or string characters or compressed numeric values and/or compressed string characters.

The term "memory location" may refer to a storage available on the processor. For example, the memory location may be a processor register. The type of the comparison may be provided either as part of an instruction word or as the content of a processor register or a memory location. The result of the comparison may be stored on processor registers or at a memory location.

Each register has a fixed length of m bits that may hold a single vector. The vector may comprise vector elements having respective size n (i.e. each vector element has or occupies n bits). Each register comprises vector elements of same size n. Based on size n, a register may have a width of 1 to m. The width of a register refers to the number of vector elements in the register.

For example, the second vector may comprise 3 vector elements having same size n=4, wherein each vector element has a respective position in the second vector (e.g. position in the register that holds the second vector). The first vector may comprise a value to be searched or queried. The value to be searched may for example be encodable on a single vector element of size of n bits. The vector element of the search value may be duplicated or replicated in the first vector at the same positions of vector elements of the second vector. For example, the first vector may contain only one copy of the vector element to search and a hardware circuit of the system may replicate the vector element to all the elements position matching the position of the elements in the second vector; or the first vector, has already the search value replicated at the appropriate positions.

The present disclosure may enable an instruction and hardware parallel-operated arbitrary width magnitude comparator that is easily scalable and efficient in terms of logic area utilization, wiring and power to accomplish the compare task. This may provide a slick very effective way to speed up the search in compressed databases and represents a key unique feature. Advantages may further comprise: Arbitrary width comparisons, Fast parallel and pipelined operations, Efficient logic area and hardware utilization; Easily scalable; separate modules can be formed.

The present method may be implemented in one or more instructions and may thus prevent a large number of instructions to perform the search e.g. on compressed variable length entries.

According to one embodiment, the compare result of the previous compare blocks comprises the values of the greater than result bit and lower than result bit. This may save resources by contrast to the case where all the comparison results are input from one block to the other block.

According to one embodiment, the second vector comprises one or more vector elements having the same size. The size of a vector element is the number of bits that may be stored on. This may further reduce instructions required for accessing or processing the vectors.

According to one embodiment, the method further comprises comparing the first vector with a third vector having vector element sizes different from the size of the vector elements of the second vector, wherein the comparing comprises repeating the method using the third vector as the second vector, wherein the first vector comprise vector elements having size of vector elements of the third vector. This may provide a method that may be seamlessly integrated with different systems having different storage structures, namely different vector element sizes.

According to one embodiment, in case the size of the vector elements is higher than a predefined threshold, providing a delay unit between at least two compare blocks of the compare blocks for delaying the result bit outputs of one of the two compare blocks. For example, for large vector element size n the comparison may take more than one clock cycle. In this case a timing staging register such as a staging latch may be added between some of the one-bit compare blocks. Compare results crossing such a staging register are then delayed by one cycle.

According to one embodiment, the result bit outputs are delayed by one clock cycle.

According to one embodiment, the delay unit is a timing staging register.

According to one embodiment, the method further comprises: outputting the result bits of each compare block, and selecting the result of comparing from all output results.

According to one embodiment, wherein the equal result bit, EQ_out, of a compare block is obtained by: EQ_out= (EQ_in AND CE_in) AND (A_in==B_in), where EQ_in= (GT_in=0) AND (LT_in=0), GT_in is the greater than input bit and LT_in is the lower than input bit, and CE_in is the cascade enable input bit, A_in and B_in are the two number input bits, wherein the greater than result bit GT_out= (A_in>B_in) OR ((A_in==B_in) AND (GT_in AND CE_in)), and lower than result bit LT_out=(A_in <B_in) OR ((A_in==B_in) AND (LT_in AND CE_in)). By providing all three result bits for each of the one bit compare block, the results may be efficiently combined.

Figure 1:
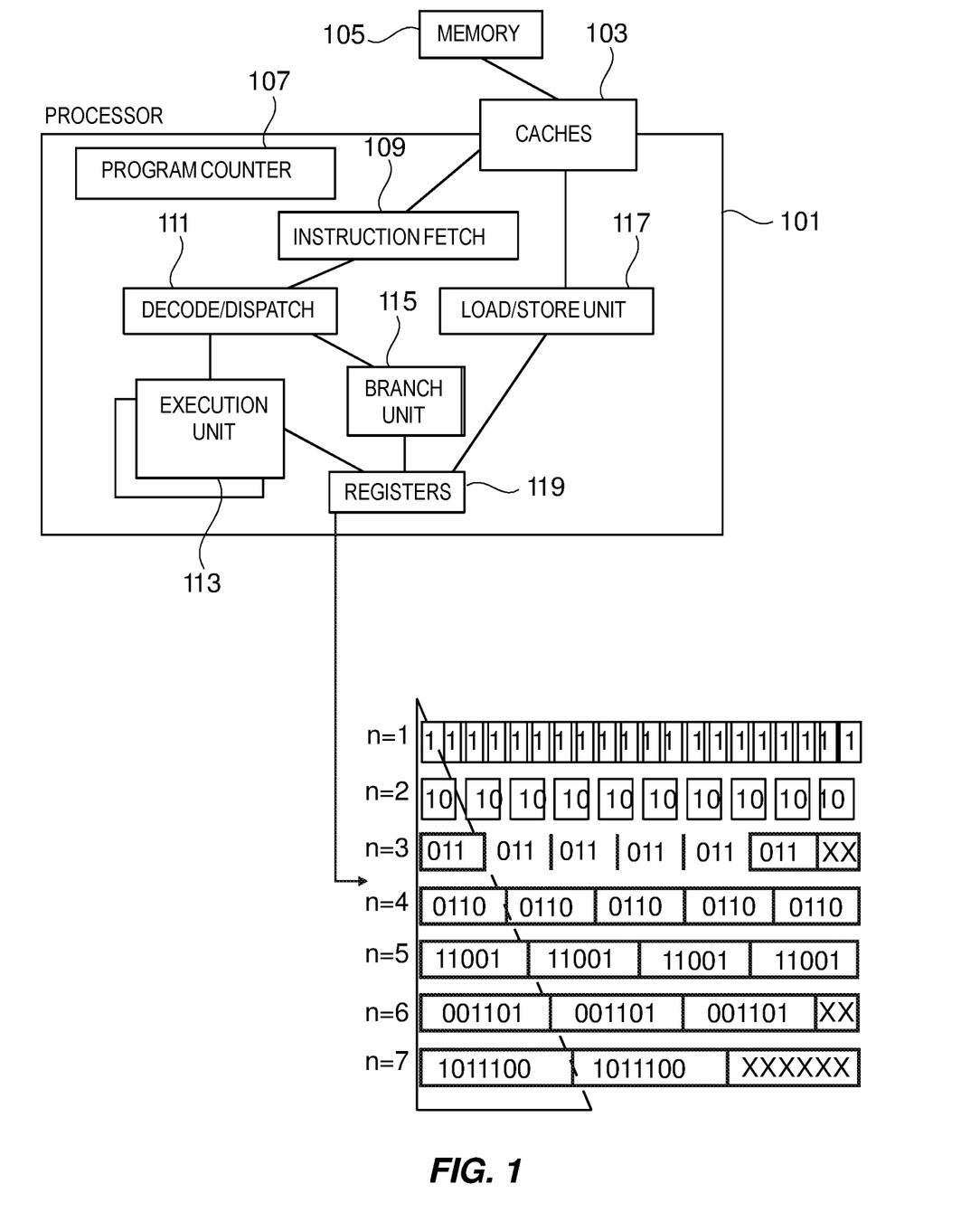
FIG. 1 is an exemplary structure of a processor in accordance with the present disclosure.

FIG. 1 is an exemplary structure of a processor 101. For example, one or more levels of cache 103 are employed to buffer memory data in order to improve processor performance. The cache 103 is a high speed buffer holding cache lines of memory data that are likely to be used. Typical cache lines are 64, 128 or 256 bytes of memory data. Cache 103 is caching data of higher hierarchical storage being main memory storage 105.

A program counter (instruction counter) 107 keeps track of the address of the current instruction to be executed. A program counter in a z/Architecture processor is 64 bits and can be truncated to 31 or 24 bits to support prior addressing limits. A program counter may typically be embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture may be CISC instructions having a length of 2, 4 or 6 bytes. The Program counter 107 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 107.

Typically an instruction fetch unit 109 is employed to fetch instructions on behalf of the processor 101. The fetch unit 109 either fetches "next sequential instructions", target instructions of branch taken instructions, or first instructions of a program following a context switch. Examples of Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 101. For example, the fetched instruction(s) are passed to a dispatch unit 111 of the fetch unit. The dispatch unit 111 decodes the instruction(s) and forwards information about the decoded instruction(s) to appropriate units 113, 115, 117. An execution unit 113 may typically receive information about decoded arithmetic instructions from the instruction fetch unit 109 and may perform arithmetic operations on operands according to the opcode of the instruction. Operands are provided to the execution unit 113 preferably either from memory 105, architected registers 119 or from an immediate field of the instruction being executed. Results of the execution, when stored, are stored either in memory 105, registers 119 or in other machine hardware (such as control registers, PSW registers and the like).

As shown in FIG. 1, registers 119 may have a same size m. For example, each of the registers 119 may store m bits. In the example of FIG. 1, m=20. Each register of the registers may store a vector of bits, wherein the vector comprises element vectors of respective size n. FIG. 1 shows that registers 119 may for example store an input vector for variable element length n between 1 and 7.

In order to obtain the m bits, each register may be completed by garbage bits depending on the vector element's length n. For example, in case n=7, the register may comprise only two vector elements (of 14 bits) and remaining 6 bits are not sufficient to store a vector element of size 7 and thus may be used as garbage bits. The number of vector elements per register may be referred to as the width w of the register or of the vector stored in the register.

The data stored in the register 119 may be for example be processed or formatted in accordance with IBM BLU Acceleration technology for analytic queries. For example, the data may be compressed data e.g. based on an approximate Huffman encoding. Such compressed data may not be decoded (or uncompressed) when processing SQL predicates (that is, =, <, >, >=, <=, BETWEEN etc.), joins, aggregations, and more. The data may be searched directly as decompressing the data first is a lengthy and costly operation.

The data stored in the registers 119 may for example be processed using a parallel vector processing technique e.g. using Single Instruction Multiple Data (SIMD) hardware.

Figure 2:
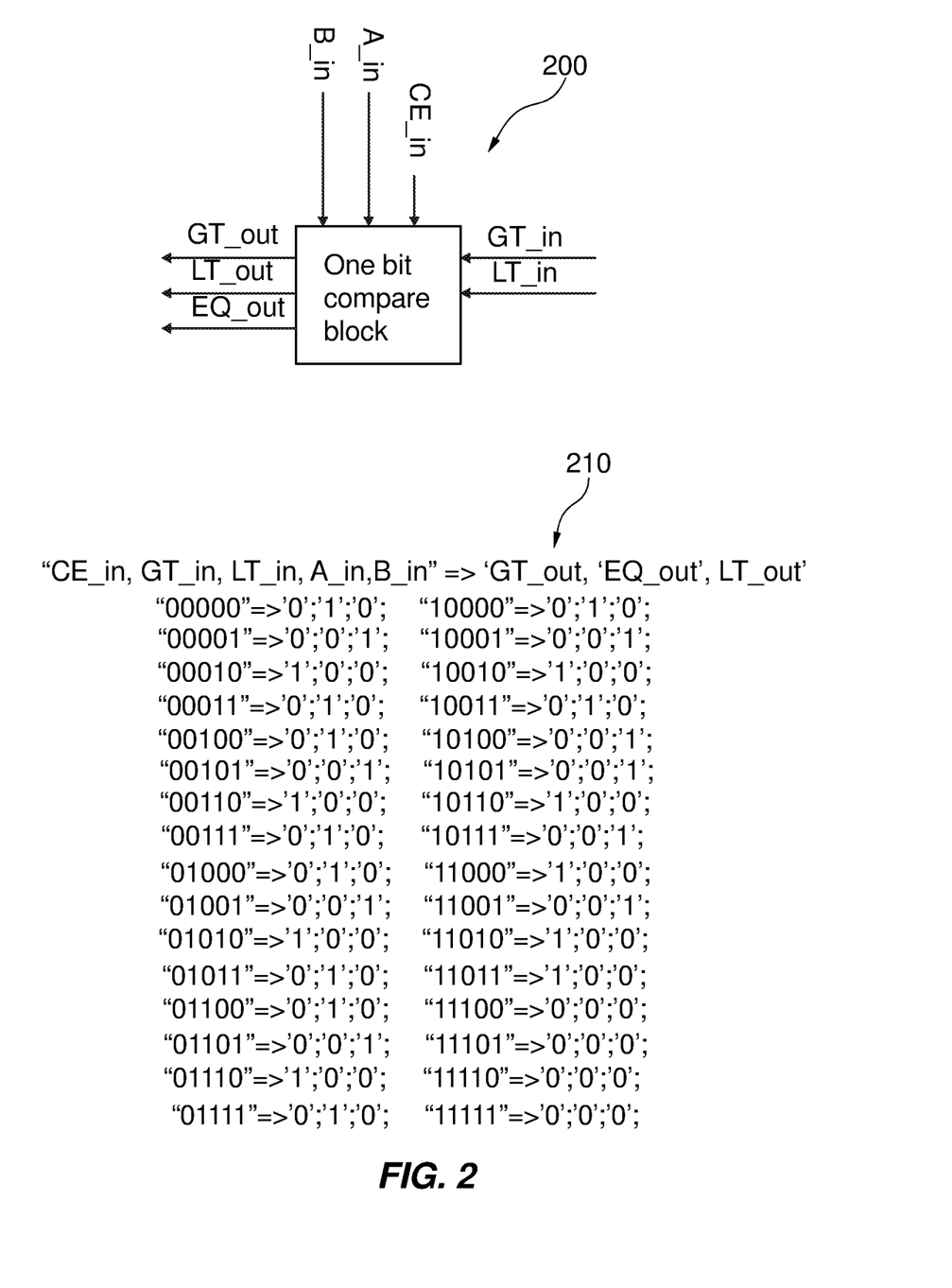
FIG. 2 depicts a one-bit compare block in accordance with the present disclosure.

FIG. 2 depicts a one-bit compare block 200 in accordance with the present disclosure. The one-bit compare block 200 has as inputs one bit from two vectors to be compared, namely input bit A_in for one vector and input bit B_in for the other vector. The one-bit compare block 200 further has a cascade enable bit (CE_in) that controls if the greater-than and less-than results (GT_in and LT_in) of a previous one-bit compare block should be taken into account. The outputs of the one-bit compare block 200 are an equal EQ_out, greater than GT_out and less than signals LT_out that represent the compare results of the n previous one-bit compare blocks with CE_in=1.

The outputs EQ_out, GT_out and LT_out are generated based on the truth table 210. The truth table 210 as shown in FIG. 2 comprises an example mapping between the group of values (CE_in, GT_in, LT_in, A_in and B_in) and the corresponding output group (EQ_out, GT_out and LT_out).

The outputs EQ_out, GT_out and LT_out may be obtained by the following Boolean operations involving bitwise operations:

$$GT\_out = (A\_in > B\_in) \text{ OR } ((A\_in == B\_in) \text{ AND } (GT\_in \text{ AND } CE\_in)).$$

$$LT\_out = (A\_in < B\_in) \text{ OR } ((A\_in == B\_in) \text{ AND } (LT\_in \text{ AND } CE\_in)).$$

$$EQ\_out = (EQ\_in \text{ AND } CE\_in) \text{ AND } (A\_in == B\_in),$$
where $EQ\_in = (GT\_in = 0) \text{ AND } (LT\_in = 0).$ Please note that with regard to FIG. 2, the inputs 11100, 11101, 11110, and 11111 are illegal, and any and all output combinations generated are contemplated within the scope of the invention. Outputs '0'; '0'; '0' are displayed for the sake of simplicity.

Figure 3A:
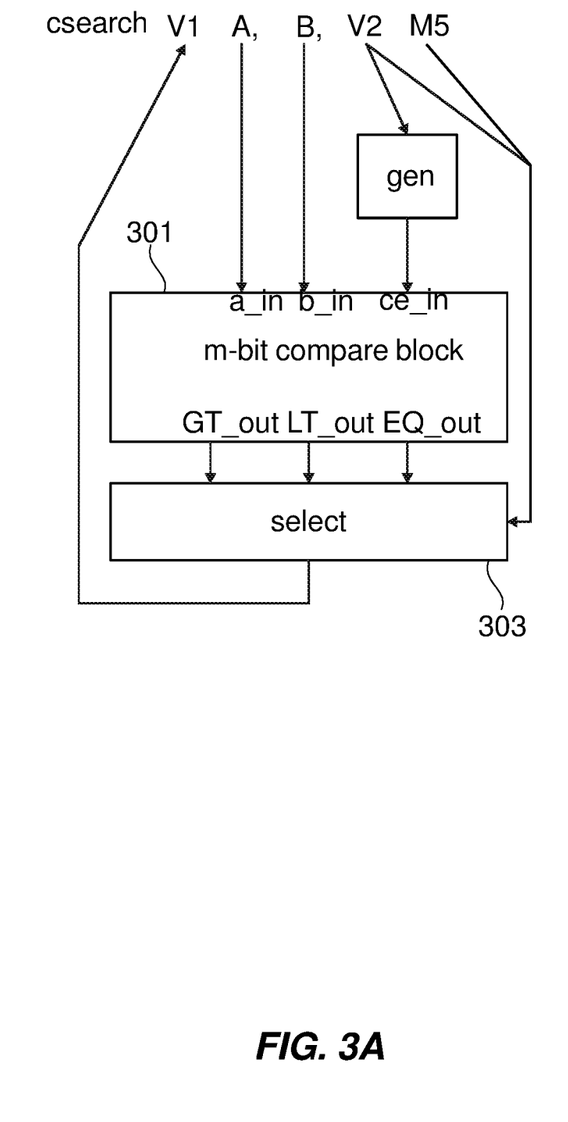
FIG. 3A illustrates the instructions and corresponding hardware blocks for comparing multiple elements contained in a vector.

FIG. 3A illustrates the instruction and corresponding hardware blocks for comparing multiple vectors.

For example, an instruction for performing searches in accordance with the present disclosure may be defined as follows: csearch V1, A, B, V2, M5. V1 is the result vector that contains the results of comparing the vectors A and B. A and B are stored in respective registers. V2 contains the length of the vector elements in the vectors A and B. M5 encodes compare type (=, <, >, <=, =>) as well as the value of V2. The comparison result is saved in V1.

The vectors A, B and V2 are input to a compare block 301. And the outputs of the compare block 301 are selected using a selector (e.g. multiplexer) 303. The selection is based on the type of comparison being performed and the length of the vector elements as encoded in M5. For example, if the comparison involves an equal operator only EQ_out bits obtained from each of the compare blocks are stored in V1. V1 may be stored in a register 119 as described with reference to FIG. 1.

Figure 4A:
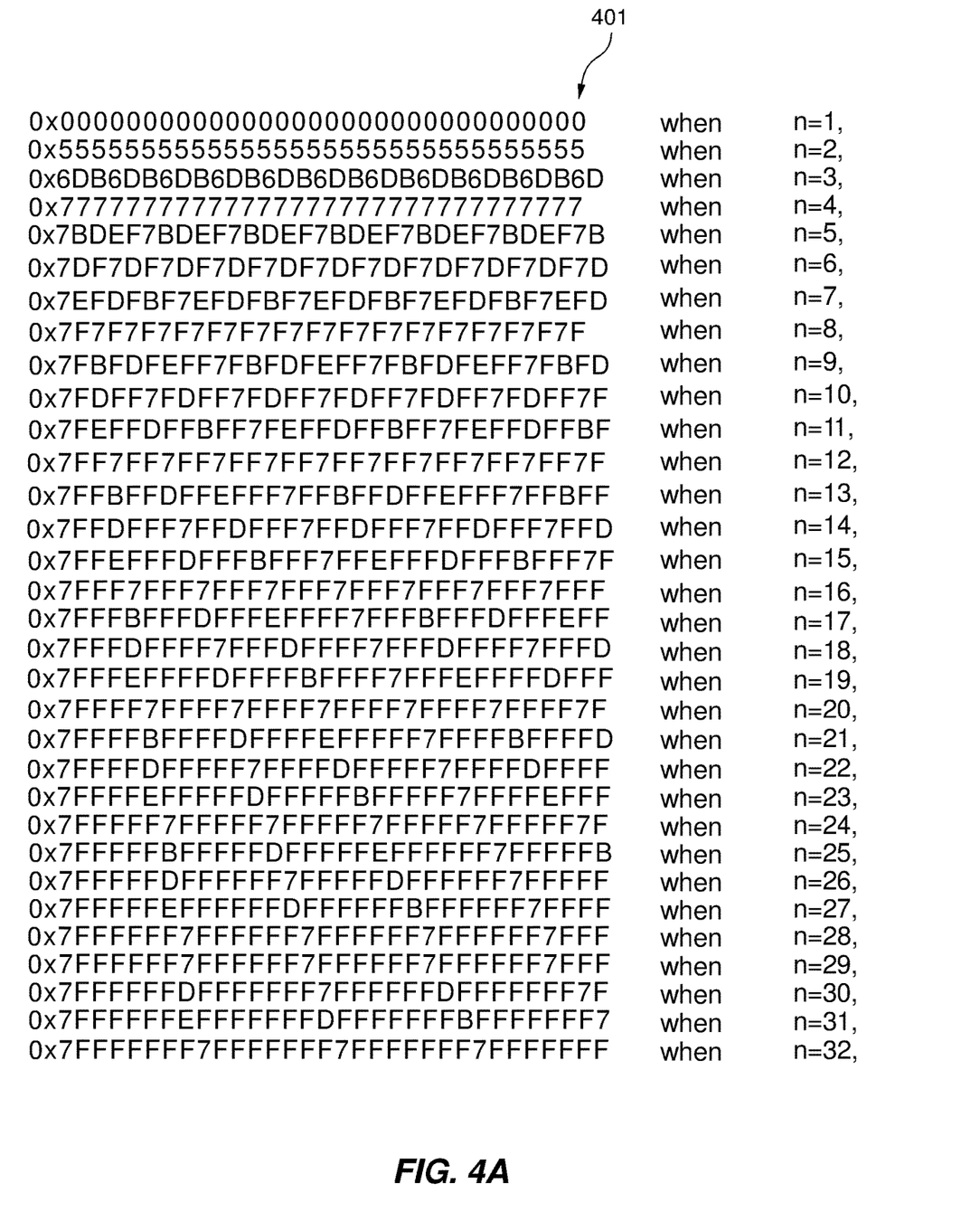
FIG. 4A is a table of example values of cascade enable input vector.
Figure 4B:
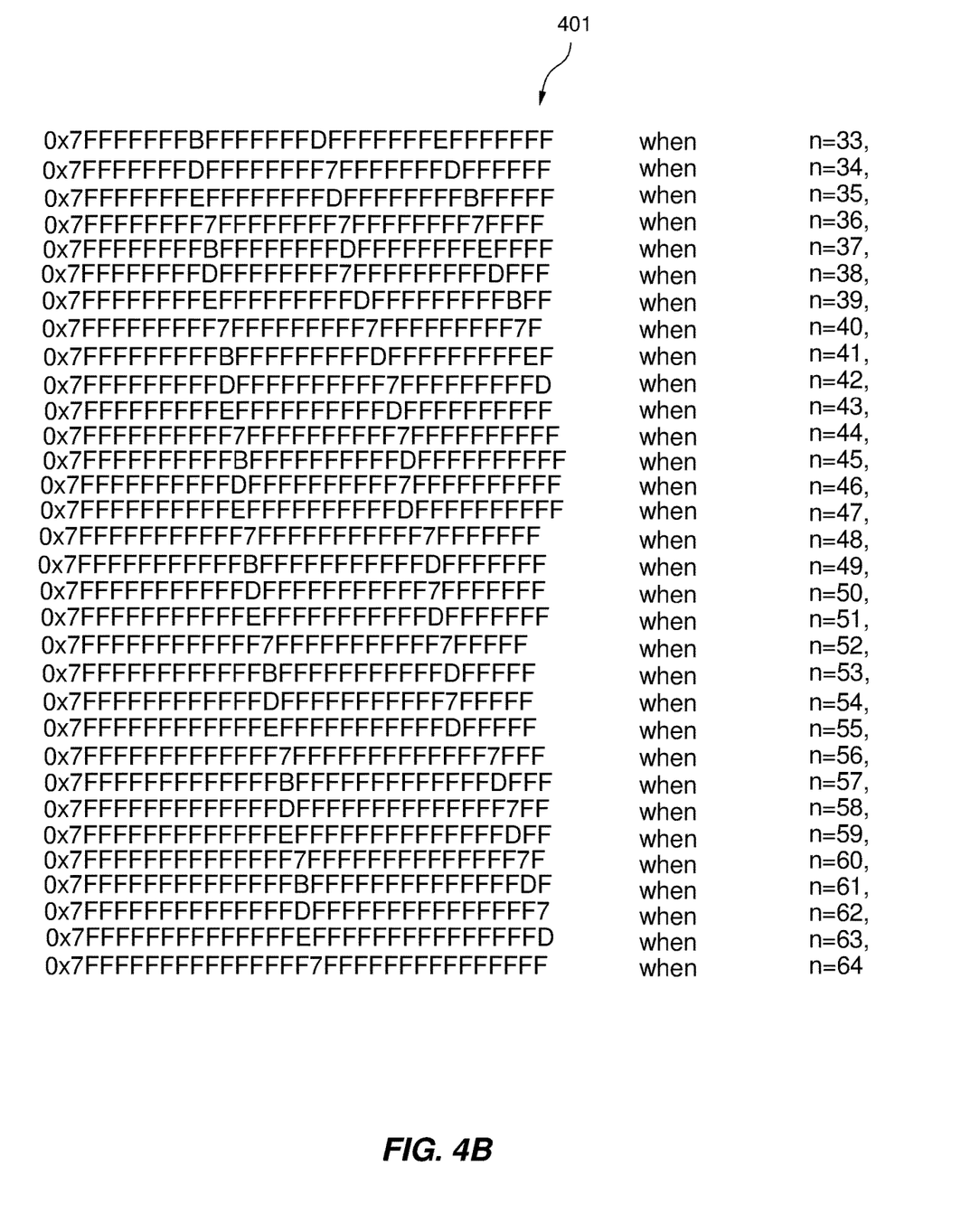
FIG. 4B is a table of example values of cascade enable input vector.

In order to support the variable length comparison, the CE_in vector needs to be zero at the boundary between two vector elements inside the vector B, else one. The CE_in may for example be set using V2. The table 401 of FIGS. 4A and 4B shows example values for the CE_in vector for 128 bit registers and vector elements of the size or length of 1 to 64. The CE_in may be predefined or selected based on the length value in V2, or may be passed as a register vector V2 containing the bit values for the CE_ins as shown in FIGS. 4A and 4B.

Figure 3B:
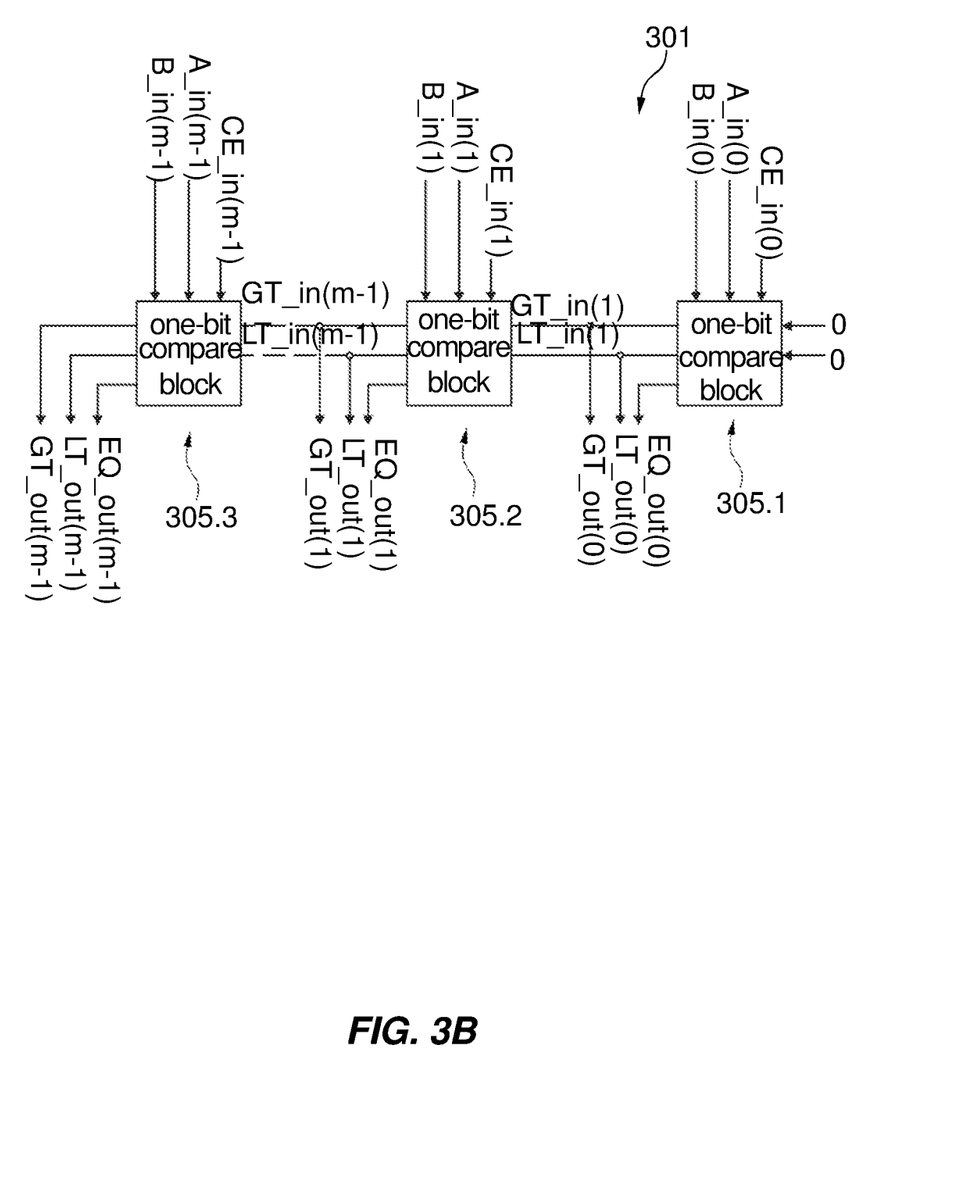
FIG. 3B illustrates a daisy chaining example of one bit compare blocks.

For example, the registers of the processor 101 may comprise m bits each. The input vector B may have elements having m bits to be compared against bits of the other input vector A. The input vector A may for example be a searched query value. For such a comparison, the compare block 301 may comprise m one-bit compare blocks 305.1-305.m which are daisy chained as illustrated in FIG. 3B. The most significant bit of each element of the output vectors GT_out, LT_out and EQ_out represent the result of the comparison (greater, less, equal) for that element of the vector. Assuming for example that B has w=3 vector elements (B1, B2 and B3) of size n each. The searched value may be encoded on a vector element of size n. vector A comprises a vector element having the size n that is replicated w times to match the number of vector elements of B. A comprises vector elements A1, A2 and A3 each comprising the searched value and have positions corresponding to positions of the B1-B3 respectively. The m-one bit compare blocks may be used to compare A1 with B1, A2 with B2 and A3 with B3. The CE_in enables to switch between different comparisons. For example, the first time CE_in=0 is read the comparison starts between A1 and B1, and once a CE_in=0 again this indicates that a new comparison is to be started between A2 and B2 and so on.

For example, the comparison may involve an equal operator. Assuming for exemplification purpose that the vectors have vector elements of size 3 (n=3) which may for example also be the size of the register m=3. For example a vector having a vector element B="011" may be stored in the processor 101 and the comparison is triggered by a query requiring the database entries which match "3". For example, value 3 may be encoded on 3 bits as A="011". The comparison may involve comparing A and B. B_1 (or B(1))=0, B_2 (or B(2))=1, B_3 (or B(3))=1.

Since the vectors A and B have size of three bits (m=3), three of the one bit compare blocks may be connected or daisy chained per group to compute the result of comparing A and B. Only an equal is obtained as a result, when all three bits of A match B ('011').

For that, a first comparison is performed between the least significant bit A_3 against B_3 by the first one bit compare block 305.1. For this first one bit compare block 305.1, the CE_in=0, and thus the GT_in/LT_in information is ignored when comparing A_3 with B_3. The GT_in and LT_in for the first bit compare block 305.1 may be set to 0. In the comparison, "0" is considered less than "1". The output of the first one bit compare block 305.1 is GT_out, LT_out and EQ_out, where the GT_out and LT_out are inputs to a second one bit compare block 305.2 as GT_in and LT_in respectively.

The outputs may be obtained by the following Boolean operations involving bitwise operations:

$$GT\_out=(A\_in > B\_in) \text{ OR } ((A\_in == B\_in) \text{ AND } (GT\_in \text{ AND } CE\_in)).$$

$$LT\_out=(A\_in < B\_in) \text{ OR } ((A\_in == B\_in) \text{ AND } (LT\_in \text{ AND } CE\_in)).$$

$$EQ\_out=(EQ\_in \text{ AND } CE\_in) \text{ AND } (A\_in == B\_in),$$
where $EQ\_in=(GT\_in=0) \text{ AND } (LT\_in=0).$ Since A_3=B_3, EQ_out=1, GT_out=0 and LT_out=0 for the first one bit compare block 305.1.

Then, a second comparison is performed between A_2 and B_2 using the second one bit compare block 305.2 which is connected to the first one bit compare block 305.2. For this second one bit compare block 305.2 the CE_in=1. This indicates that the GT_in/LT_in obtained from the first bit compare block 305.1 may be taken into account.

Since A_2=B_2 and GT_in=LT_in=0, EQ_out=1, GT_out=0 and LT_out=0 for the second one bit compare block 305.2.

Then a third comparison is performed between A_1 and B_1 using a third one bit compare block 30.5.3 (m=3) which is connected to the second one bit compare block 305.2. For this third one bit compare block 305.3 the CE_in=1. This indicates that the GT_in/LT_in obtained from the second bit compare block 305.2 may be taken into account. An equal is obtained since A_1=B_1 and GT_in=0 and LT_in=0.

In another example, the comparison involves a greater than comparison A>B which mathematically means that A(1,2,3)>B(1,2,3). This can be obtained by A(1)>B(1) or A(1)=B(1) and (A(2,3)>B(2,3)), where A(2,3)>B(2,3) can recursively be computed as "A(2)>B(2) or A(2)=B(2) and (A(3)>B(3))". This gives the equation GT_out=(A_in>B_in) OR ((A_in==B_in) AND (GT_in AND CE_in)) used by each of the compare blocks 305.1-305.m. Similarly with the comparison involving a less than comparison A<B, the equation LT_out=(A_in<B_in) OR ((A_in==B_in) AND (LT_in AND CE_in)) can be used by each of the compare blocks 305.1-305.m.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A comparator for optimizing performance of a computer database by performing comparisons between a first and a second vector of multiple bits each stored in one or more processor registers or memory locations to compare two single bits, one from the first vector and one from the second vector, using compare blocks, each compare block comprising:
   two input bits associated with one of the bits from the first and second vector respectively;
   a greater than input bit and a lower than input bit;
   a cascade enable input bit to control if the greater than input bit and the lower than input bit are considered during a comparison; and
   a greater than result bit, a lower than result bit, and an equal result bit;
   wherein the comparator performs a daisy chaining of m one-bit compare blocks, where m is a real number greater than 1, such that the result bits of one compare block represent the compare result of any of previous compare blocks in the chain when the cascade enable input bits are set for each of the compare blocks, and cascade enable input bits are disabled to implement a boundary between two vector elements, wherein the boundary between two vector elements is zero or 1, and
   wherein a type of the comparison specifies one of the following comparison results between two bits: equal, greater, lower, lower or equal, greater or equal.

2. The comparator of claim 1, wherein the compare result of the previous compare blocks comprises the values of the greater than result bit and lower than result bit.

3. The comparator of claim 1, wherein the second vector comprises one or more vector elements having the same size.

4. The comparator of claim 1, further comprising comparing the first vector with a third vector having vector element sizes different from the size of the vector elements of the second vector, wherein the comparing comprises using the third vector as the second vector, wherein the first vector comprises vector elements having size of vector elements of the third vector.

5. The comparator of claim 3, wherein when the size of the vector element is higher than a predefined threshold, providing a delay unit between at least two compare blocks of the compare blocks for delaying the result bit outputs of one of the two compare blocks.

6. The comparator of claim 5, wherein the result bit outputs are delayed by one clock cycle.

7. The comparator of claim 5, wherein the delay unit is a timing staging register.

8. The comparator of claim 1, wherein the equal result bit, EQ_out, of a compare block is obtained by:
   EQ_out=(EQ_in AND CE_in) AND (A_in ==B_in),
   where EQ_in =(GT_in=0) AND (LT_in=0), GT_in is the greater than input bit and LT_in is the lower than input bit, and CE_in is the cascade enable input bit, A_in and B_in are the two number input bits, wherein the greater than result bit GT_out=(A_in >B_in) OR ((A_in ==B_in) AND (GT_in AND CE_in)), and lower than result bit LT_out=(A_in <B_in) OR ((A_in==B_in) AND (LT_in AND CE_in)).

9. The comparator of claim 1, further comprising writing the result bits of each one bit compare block in respective bits of a register or memory address, resulting in vector elements for the greater than result bit, lower than result bit, and equal result bit and selecting vector elements of the resulting vector elements that correspond to the type of comparison being performed with regard to the database between the first vector and second vector.

10. The comparator of claim 1, wherein the memory locations have a length of m bits.

11. The comparator of claim 1, wherein bits of the multiple bits represent numeric values or string characters stored in one or more memory locations.

\* \* \* \* \*